June 20, 1950     E. GATERMAN     2,511,842
ADJUSTABLE WINDROW RECEIVING AND PLACING DEVICE
Filed Dec. 29, 1943
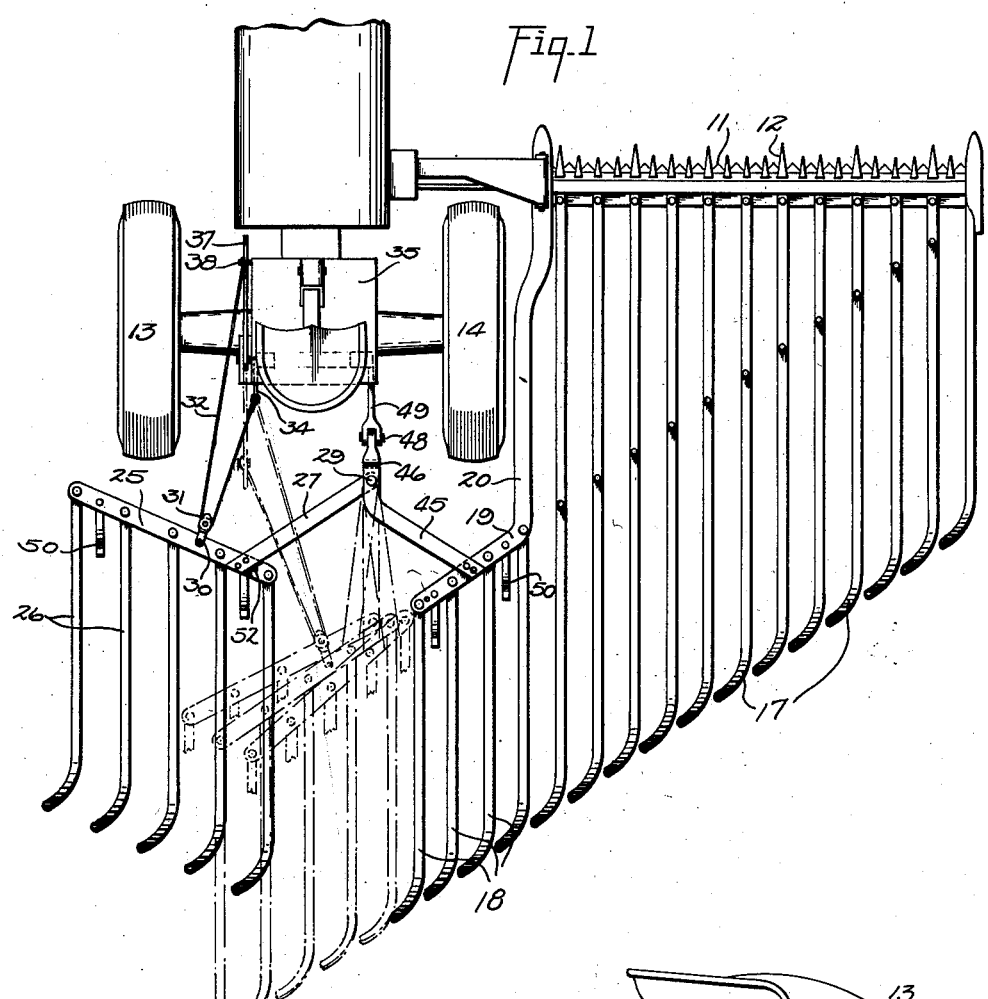
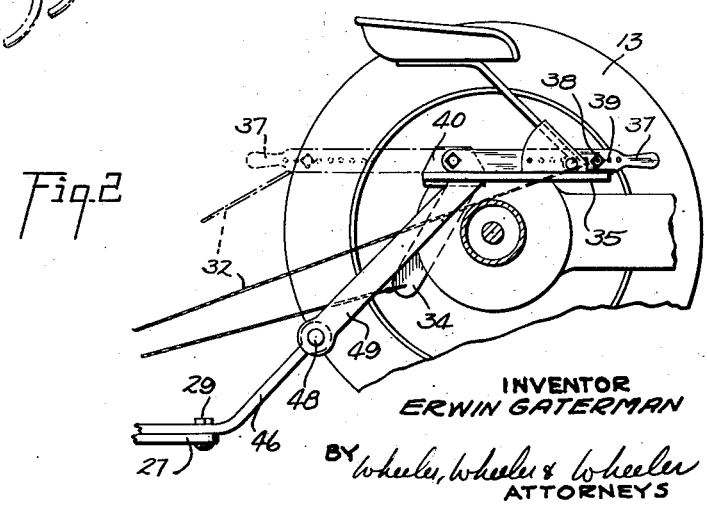
INVENTOR
ERWIN GATERMAN
BY Wheeler, Wheeler & Wheeler
ATTORNEYS Patented June 20, 1950

2,511,842

UNITED STATES PATENT OFFICE 2,511,842

ADJUSTABLE WINDROW RECEIVING AND PLACING DEVICE

Erwin Gaterman, Manitowoc, Wis., assignor to Gaterman Manufacturing Company, Manitowoc, Wis., a partnership Application December 29, 1943, Serial No. 516,002

3 Claims. (Cl. 56—192)

My invention relates to improvements in windrow receiving and placing attachments for mowing machines.

The object of my invention is to provide means whereby a mowing machine of any type equipped with an ordinary windrow forming attachment may be additionally equipped with a separate or auxiliary windrow receiving and placing device, adjustable into and out of operative relation to a windrow forming attachment.

More particularly, it is my object to provide means for pivotally supporting a windrow receiving and placing device from a point above the ground between the wheel tracks of any mowing machine with which it may be connected and at a point sufficiently remote from either the mowing machine or the windrow forming attachment to allow the device to be readily swung from an operative position by an operator of the mowing machine initially in a movement nearly at right angles to the line of mowing machine travel but in an arc curving laterally and forwardly from operative position to a position where it will not interfere with windrow delivery by the windrow forming attachment.

A further object of my invention is to provide a windrow receiving and placing device which can be adjusted in differently pitched windrow receiving relations to a windrow forming attachment.

A still further object is to provide improved means for supporting a windrow receiving and placing device from a point rearwardly distant from the mowing machine, and laterally distant from the windrowing attachment.

In the drawings:

Figure 1 is a plan view of a fragment of a mowing machine equipped with a windrowing attachment and a windrow receiving and placing device embodying my invention.

Figure 2 is a detail in side elevation, showing the adjusting lever and associated parts in relation to the operator's seat on the mowing machine.

Like parts are identified by the same reference characters throughout the several views.

The mowing machine and its windrow forming attachment may be of any ordinary construction. The attachment always occupies a trailing position with reference to the mowing machine guard bar and sickle. Therefore the attachment and the wheeled portion of the mowing machine form an angle back of the mowing machine wheels into which the windrow may be delivered by the attachment.

The more modern windrow forming attachments have delivery portions extended across the right-hand mowing machine wheel track in order to deposit the windrow far enough to the left to be out of the path of the left-hand wheel when cutting the next swath, and in positions to facilitate picking up with a hay loader, hay baler or combine. Also to facilitate drying the cut hay, clover, seed peas, soy beans, and other crops in the windrow it is necessary to avoid compression of the windrowed crops by the wheels of the mowing machine, the feet of horses, or the wheels of a tractor with which the mowing machine is connected.

But the wheels of different mowing machines and of different tractors may be differently spaced. Also, it is frequently desirable that alternate windrows be paired with those immediately preceding them in order that a hay loader or tractor may straddle the paired windrows and simultaneously pick up both. To meet all of these varying conditions I have mounted an adjustable windrow receiving and placing device in the aforesaid angle formed by the wheeled portion of the mowing machine with the windrow forming attachment, said device being capable of operation as an extension of the delivery portion of the windrow forming attachment and of adjustment at various operative angles with reference thereto, and also to an inoperative position, in which the attachment will be permitted to deliver a windrow in an ordinary manner.

In the drawings I have illustrated my invention in association with a mowing machine of that type in which the sickle 11 and its guard bar 12 extend laterally from a point or line in front of the mowing machine wheels 13 and 14. The windrow forming slats 17 are in trailing relation to the guard bar, and the delivery slats 18 have their front ends connected with an angular extension 19 of the side bar 20. These parts may be of any ordinary construction and require no further description.

My improved windrow receiving and placing device comprises a bar 25 having a set of windrow guiding slats 26 similar to the slats 18 and adapted to serve as an extension of the row of slats 18, all of the slats being upturned at their rear ends, as shown. The right-hand end of bar 25 has an arm 27 which extends forwardly and is pivotally secured at 29 to a suitable support connected with the mowing machine at any suitable point, such as the mowing machine platform, and also with the extension 19 of the attachment. When the placing device is in operative position, arm 27 serves as a drag bar for the placing device, which is thereby held with one end of the bar 25 in proximity to the free end of arm 19.

But bar 25 carries a bracket 30 provided with a pulley 31, and a bar adjusting cable 32 has one end attached to a supporting arm 34 depending from the mowing machine platform 35, said cable extending around the pulley 31, with its other end adjustably connected with a lever 37 by a pin 38. The connecting pin 38 may be inserted in any one of a series of holes 39 in the lever to determine the pitch of the bar 25 with reference to the arm 19 when the placing device is in operative relation to the windrow former, and thereby vary the point of windrow deposit by the placing device. By connecting the cable at different points along the lever 37 the pitch of the bar 25 with reference to that of the arm 19 may be varied, as shown by the three sets of dot and dash lines in Figure 1, although the opposing ends of these two arms may remain in close proximity to each other.

The windrow former delivers the windrows in the form of a loosely wound roll, which, at the time of delivery, is being propelled along the ground by the upturned rear ends of the slats. Therefore it is ordinarily not necessary that the opposing ends of the bars 19 and 25 should be in contact or even that they should be in very close proximity. Neither the spacing of the illustrated bars nor the number and spacing of the slats 18 and 26 is essential to the invention herein claimed.

One end of the lever 37 is pivotally connected with a platform bracket 40, the base of the bracket being sufficiently wide to serve as a stop, limiting the swinging movement of the lever. When the lever is in its extreme forward position, as shown by full lines in Figure 1, the windrow receiving and placing device will be in its inoperative position, as also shown by full lines in said figure. When the lever is swung backwardly to the dotted line position the device will be allowed to swing into operative relation to the windrow forming attachment, and the pitch of the bar 25 with reference to the arm 19 will be determined by the point of connection of the cable 32 with the lever.

When the lever is swung backwardly with the pin 38 attached thereto as shown in the drawings, the bar 25 will be in line with the arm 19. By adjusting the pin 39 in one of the holes nearer the handle end of the lever, the bar 25 may be supported in the forward dot and dash line position of Figure 1, whereas by adjusting the pin 38 toward the fulcrum of the lever the bar 25 may be permitted to swing to its rear dot and dash line position of Figure 1. By means of these adjustments and others of a similar character that may be made, the windrow can be deposited at varying distances from the windrow forming attachment. Therefore, regardless of the spacing of the mowing machine wheels 13 and 14, the windrow can be deposited in a position where it will not be compressed by one of the wheels of the mowing machine when cutting a subsequent swath.

Also, when one swath is being cut it may be deposited between the wheel tracks of the mowing machine by the windrow forming attachment, the bar 25 being then in its inoperative position. When cutting the next or alternate swath the windrow placing device may be adjusted in an operative position to deposit the alternate windrow in a desired degree of proximity to the previously formed windrow. The wheels of a hay loader are always widely separated, thus allowing considerable variation in the spacing of the paired windrows, whereby such windrows may be properly placed with reference to the spacing of the particular tractor employed for drawing the hay loader or of the horses if the hay loader is horse drawn. If the tractor has a single front center wheel the paired windrows must be spaced to allow such wheel to pass between them. If the front wheels of the tractor are paired the windrows may be paired in closer proximity to allow such wheels to straddle the pair, and if the vehicles are horse drawn, the windrows may be similarly straddled. My improved windrow placing device enables me to meet all requirements imposed by the various types of farm machinery used on different farms.

The support for the pivot pin 29 may be connected either with the mowing machine or with the windrow forming attachment, or with both. In the construction illustrated I have shown the oblique extension 19 of the side bar 20 of the windrow forming attachment as having a fork at its rear end, one arm of which comprises the rear end of the extension 19 and the other comprises an arm 45 provided with an elbowed portion 46, to which the pivot pin 29 is secured. I have also shown the elbowed portion 46 pivoted at 48 to a supporting arm 49 extending rearwardly from the platform 35.

The arc of swinging movement of the bar 25 is determined by the location of the support for the pivot pin 29. The length of the arm 27 and of the cable 32 is sufficient to allow the bar 25 to remain in sufficiently close proximity to the ground to enable it to travel upon runners 50, arm 19 being provided with similar runners.

Inasmuch as the drag bar 27 occupies substantially a trailing position when the auxiliary placing device is in use, no additional supports or connections will be required to hold it in operative relation to the windrow former. The parts not being directly connected, the windrow former and the placing device will be free for independent movement over rough ground, and the hinge connection at 48 allows independent vertical movement of the mowing machine. The windrow former, the windrow placing device, and the mowing machine have loose jointed connection with each other at 29 and 48, whereby each is free for independent vertical movement when travelling over rough ground.

Also, inasmuch as the drag bar or arm 27 is nearly in the line of forward mowing machine travel when the placing device is in its operative position, the initial movement toward the inoperative position will swing the bar 25 laterally at substantially a right angle to that line of movement, thus immediately producing a wide gap between the placing device and the windrow former, and allowing the latter to function independently while the bar 25 is being adjusted to its extreme forward position. In the extreme forward position, the cable extends from its connection with the lever below the lever fulcrum, and thus tends to hold the lever in contact with the platform 35 which serves as a stop.

I claim:

1. An adjustable extension attachment for a mowing machine having a windrow device, said extension comprising a transverse bar, a series of trailing guide slats with upturned rear ends connected to the bar, a drag link having pivot means for towing connection, and a separate towing connection adjustable as to length and attached to said bar and laterally offset from the drag link, and a manually adjustable link for changing the length of the towing connection last mentioned whereby to vary the pitch of said bar with respect to the windrowing device for which it constitutes an extension.

2. The combination with a windrowing device comprising trailing slats and provided with a draw bar, of a windrow placing device comprising a transverse bar member, a drag link connected to the bar member and pivoted to the draw bar on a vertical axis for bodily swinging movement horizontally, trailing slats connected with the bar member and movable therewith angularly and to and from proximity to the trailing slats of the windrowing device first mentioned, and a towing connector of adjustable length provided with means for securing it to said bar member and extending forwardly from the bar member independently of said drag link, and a lever connection for variation in length of said towing connector while the trailing slats of said bar member are in contact with the ground and in movement thereover whereby to effect horizontal movement of the bar member and its trailing slats with respect to said windrowing device.

3. The combination with a windrowing device adapted to be towed behind a mowing machine, said device comprising trailing slats and a member extending transversely and to which said slats are connected, of an extension for said device comprising trailing slats and a transversely disposed bar to which said last slats are connected, an arm attached to said bar and projecting forwardly therefrom and provided with a pivotal towing connection, and a lever and an adjustable length towing connection pivoted to said bar and offset laterally from said arm, said bar and its trailing slats being bodily movable transversely of its path of forward movement about the said pivotal towing connection of said arm, whereby to effect movement of its slats toward and from the slats of said device, said extension being ground supported and movable automatically by ground contact toward said device when the adjustment of said adjustable towing connection permits.

ERWIN GATERMAN.

REFERENCES CITED

The following references are of record in the file of this patent:

UNITED STATES PATENTS

| Number | Name | Date |
| --- | --- | --- |
| 420,329 | Bovee | Jan. 28, 1890 |
| 744,142 | Whitely | Nov. 17, 1903 |
| 874,399 | W. Gaterman | Dec. 24, 1907 |
| 981,244 | Gaterman | June 23, 1908 |
| 1,419,051 | Hinton | June 6, 1922 |
| 1,748,592 | Wettenkamp | Feb. 25, 1930 |
| 1,792,691 | Harris et al. | Feb. 17, 1931 |
| 1,823,387 | Campbell | Sept. 15, 1931 |
| 2,121,428 | Gaterman | June 21, 1938 |